May 3, 1955      B. J. SMITH, JR      2,707,571
ARTICLE TRANSFER APPARATUS
Filed Nov. 17, 1950      5 Sheets-Sheet 1
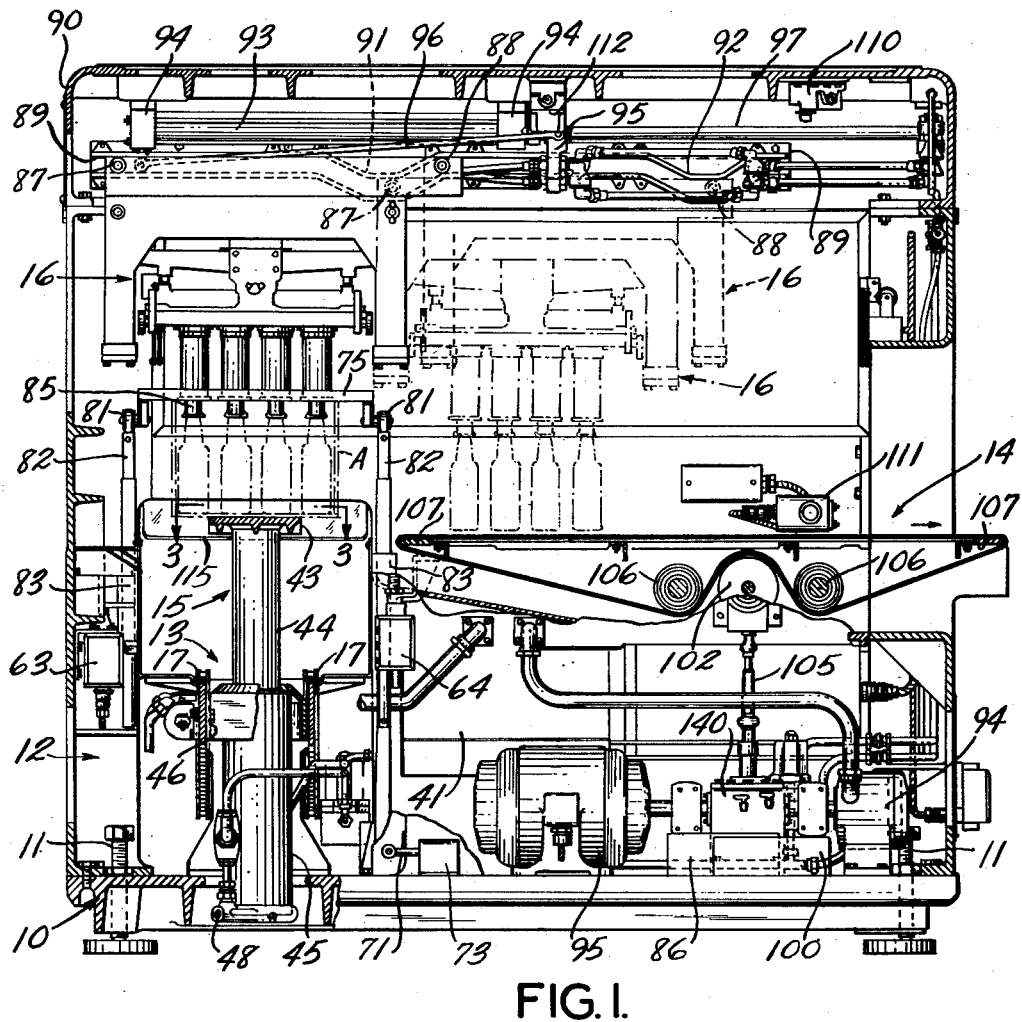
INVENTOR
BYROM J. SMITH, JR.
BY
his ATTORNEYS.

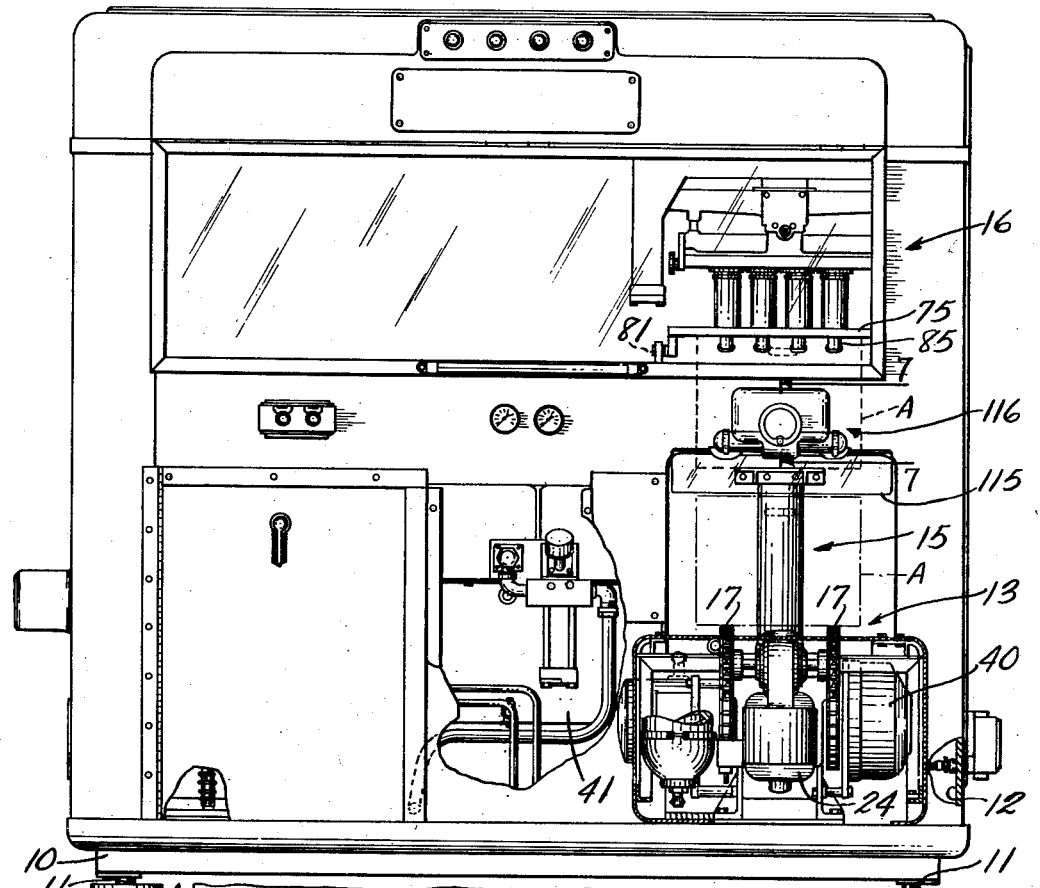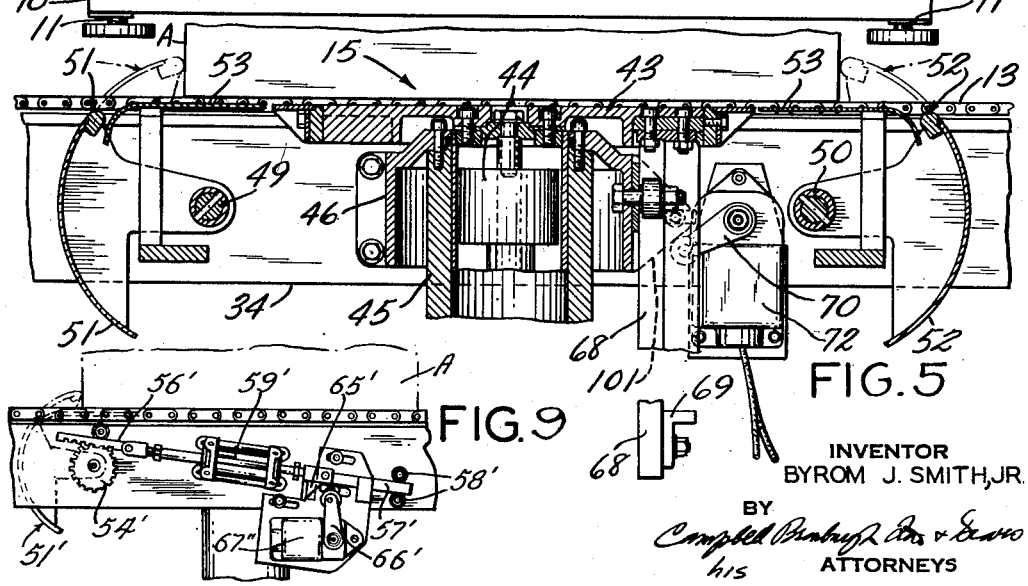

May 3, 1955
B. J. SMITH, JR
2,707,571
ARTICLE TRANSFER APPARATUS
Filed Nov. 17, 1950
5 Sheets-Sheet 3
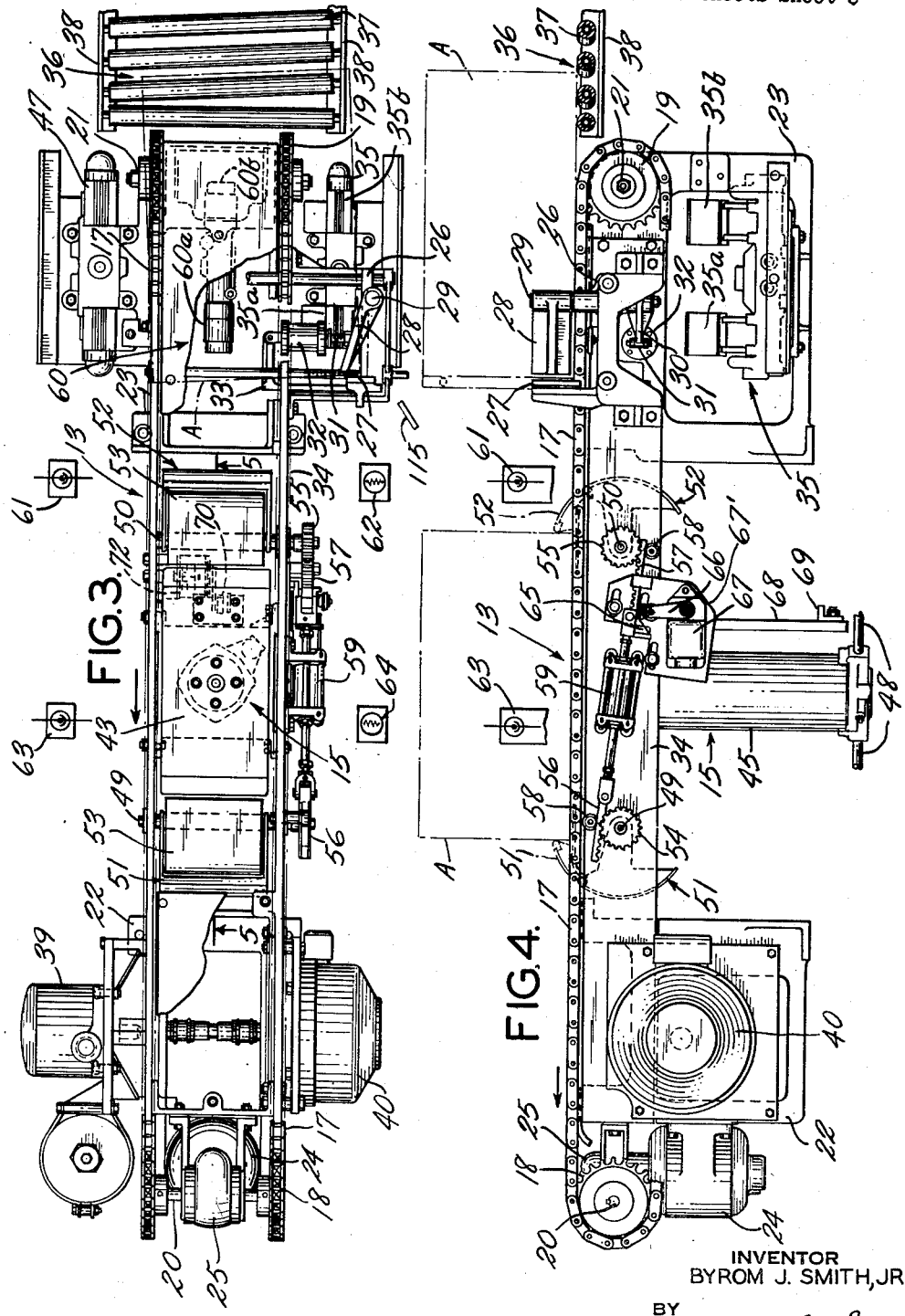
INVENTOR
BYROM J. SMITH, JR.
BY
his ATTORNEYS.

May 3, 1955

B. J. SMITH, JR 2,707,571

ARTICLE TRANSFER APPARATUS

Filed Nov. 17, 1950

INVENTOR
BYROM J. SMITH, JR.

BY
Campbell Brumbaugh Free & Dunn
his ATTORNEYS

United States Patent Office 2,707,571
Patented May 3, 1955

2,707,571

ARTICLE TRANSFER APPARATUS

Byrom J. Smith, Jr., Noroton, Conn., assignor, by mesne assignments, to Barry-Wehmiller Machinery Company, St. Louis, Mo.

Application November 17, 1950, Serial No. 196,109

18 Claims. (Cl. 214—309)

This invention relates to article transfer apparatus, and has particular reference to apparatus for automatically removing regularly arranged articles, such as bottles, cans, packages and the like, from open ended cases, crates or cartons and transferring the removed articles to outfeed conveying mechanism for a further processing operation.

Article transfer apparatus of the general nature of the present invention is disclosed in copending application Serial No. 785,304, filed November 12, 1947 by Emil Rothman, and certain of the mechanism of that apparatus is utilized in the apparatus of the present invention, and will be referred to herein, although the latter is an improvement over the apparatus of said application principally in respect to the means for transporting the removed articles from the unpacking carriage to the outfeed conveyor and the case handling mechanism.

In accordance with the present invention, apparatus is provided for unpacking articles from cases that are fed into the apparatus, stopped in centered position under a carriage having gripping jaws severally aligned vertically with the articles in the centered case, the centered case is elevated to engage the articles with the gripping jaws, the empty case is lowered for discharge from the machine, the carriage bearing the gripped articles is transferred horizontally over the article outfeed conveyor, the articles are released to the latter and the carriage returns to receiving position over the succeeding centered case to repeat the cycle.

In a preferred embodiment of the invention, the case infeed conveyor includes slanted rollers urging the incoming filled case laterally against a side rail until the case strikes a stop projecting into its path opposite an ejector plate adapted to be operated by a hydraulic cylinder to move the case sidewise a sufficient distance to allow it to escape the stop and proceed further on the conveyor. The hydraulic cylinder is actuated to effect this operation when the next preceding case operates a photoelectric switch upon discharge from center position. As the entering case is released from the stop to enter the machine, it trips a photoelectric switch restoring the aforementioned ejector plate to the position to stop the following case. Actuation of the last-named photoelectric switch causes centering arms to rise from below the conveyor and engage the front and rear surfaces of the case to center it longitudinally above an elevator platform positioned below the conveyor. If a case length check is not desired, the trailing centering arm may be omitted and the leading centering arm alone will serve as a centering device. A height gauge above the infeed conveyor is adapted to be tripped by overheight cases, and if tripped, it disables the centering mechanism and the overheight case moves through the machine without being unpacked.

After the case has been centered and the height condition satisfied, hydraulic mechanism for actuating the elevator is energized by a limit switch to raise the case to a position such that the upper ends of the articles, e. g., the necks of bottles, engage aligned gripping jaws on the carriage, one jaw for each bottle. Immediately upon insertion of the necks of the bottles into the individual gripping jaws of the head carriage, these jaws are contracted to grip the bottles, after which the case elevator descends and returns the empty case to the case conveyor for outfeed and actuates the infeed case ejector to cause the succeeding case to enter the machine.

As the elevator descends with the empty case, a hydraulic cylinder is actuated to drive a piston and rod horizontally and with it, the carriage with the bottles suspended therefrom. At the end of the travel of the carriage to a position above an outfeed bottle conveyor, the carriage descends temporarily and the gripping mechanism is released to open the jaws and deposit the bottles on the outfeed bottle conveyor while moving at the linear speed of the bottle conveyor, so that the bottles do not tip over. Thereupon the carriage is retracted to a position over the case elevator for resumption of the case unpacking cycle.

Safety provisions preclude operation of the case centering arms if the case is overheight to permit the case to go through the machine without being unpacked. Also, if the gripper carriage is not in position when the elevator is ready to raise the next case, the elevator is disabled until that condition is corrected. A photoelectric switch is provided at the bottle outfeed conveyor to stop further bottle unpacking operations by the apparatus in the event that bottles remain on the conveyor which have not been fed out thereby, and which will interfere with bottles subsequently deposited on the conveyor by the transfer carriage. This photoelectric switch keeps the machine disabled so long as there is an interfering object on the bottle outfeed conveyor, but restores the apparatus to operating condition when the field of view of the photoelectric switch is clear, indicating freedom of the bottle outfeed conveyor to receive additional bottles for transfer out of the machine. Other safety features are provided which will appear as the description proceeds.

For a more complete understanding of the invention, reference may be had to the accompanying drawings, in which:

Figure 1 is a side elevation shown partly in section and with the housing plates removed as seen from the case discharge side;

Fig. 2 is another elevation of the apparatus as seen from the case infeed side of the machine, portions thereof being shown in section;

Fig. 3 is a plan view of the case conveyor, including the infeed mechanism, the elevator, the case centering mechanism, and the outfeed mechanism as seen along the line 3—3 of Fig. 1;

Fig. 4 is a side elevation of the case handling mechanism of Fig. 3 showing the elevator in its lowermost position;

Fig. 5 is an enlarged vertical section through the elevator and the case centering mechanism as seen along the line 5—5 of Fig. 3;

Fig. 6 is an enlarged plan view of the stripper plate;

Fig. 6A is a vertical section therethrough as seen along the line 6A—6A of Fig. 6;

Fig. 8 is a schematic diagram of the electrical control system of the apparatus; and Fig. 9 is an elevation of a modification of the case stopping and aligning means.

Figure 7:
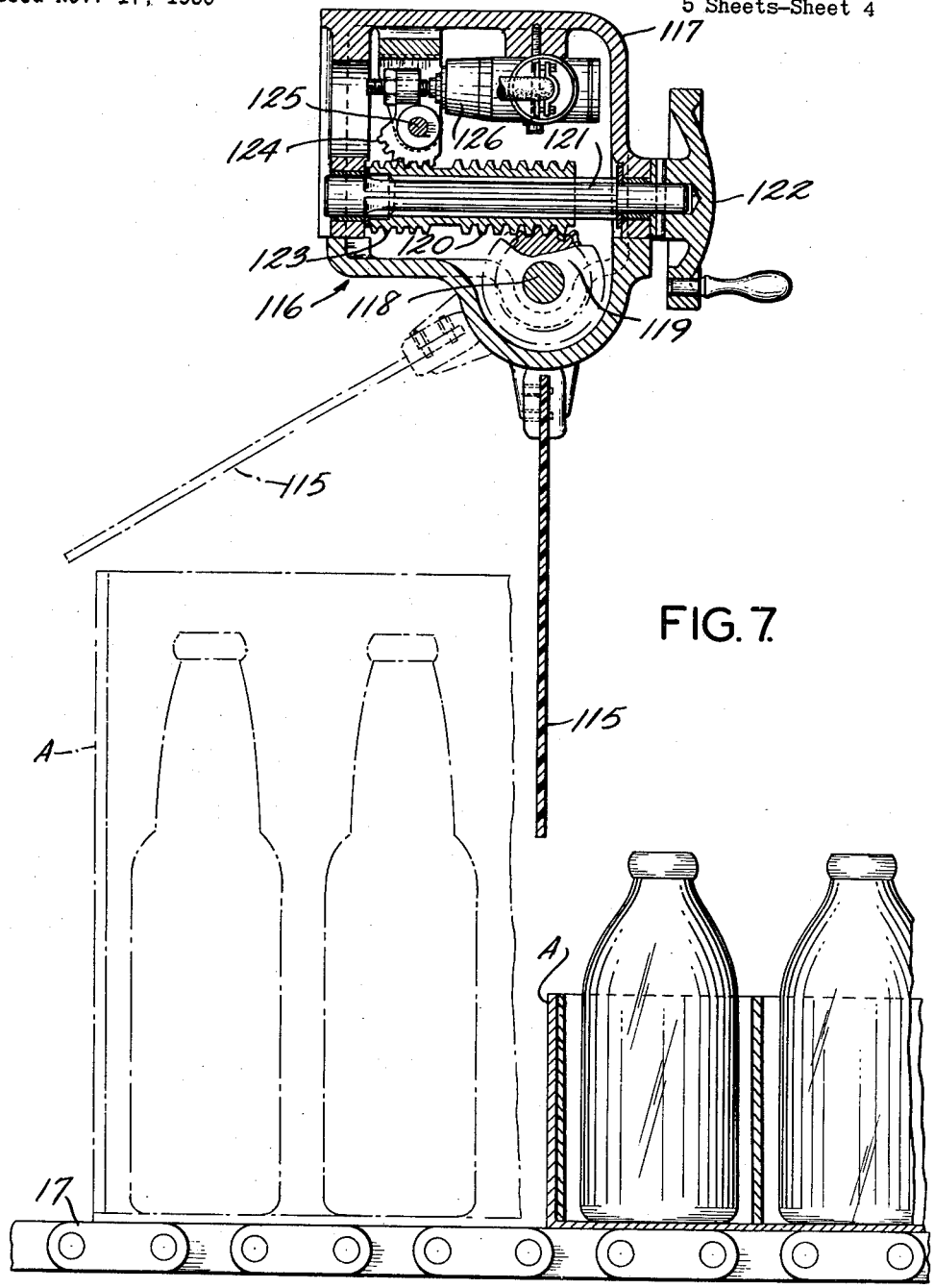
Fig. 7 is an enlarged vertical section through the case height gauge mechanism as seen along the line 7—7 of Fig. 2.

Referring to Figs. 1 and 2 of the drawings, numeral 10 designates a suitable cast metal base on which the machine is supported and may be leveled by adjusting leveling studs 11 on a floor or other support. The frame, generally designated 12, is bolted to the base 10, and is composed of several components which are of more or less conventional design and need not be described in detail.

The plan view of the machine is T-shaped, with the cross bar of the T representing the case handling unit represented generally by the case conveyor 13, shown in plan in Fig. 3 and in side elevation in Fig. 4. The vertical bar of the T is represented by the bottle outfeed conveyor generally designated 14 in Fig. 1. The junction point of the vertical and cross bars of the T, defines the location of the elevator, generally designated 15 in Figs. 1 to 5 over which the bottle transfer carriage, generally designated 16 in Figs. 1 and 2, lies in the bottle receiving position for ultimate movement from that position in a horizontal direction along the vertical bar of the T immediately over and parallel to the bottle outfeed conveyor 14, shown in Fig. 1.

The cases containing bottles or other regularly-arranged articles of substantially uniform size are unpacked in the apparatus of this invention in continuous succession providing the cases are all of a predetermined length, although the machine is adjustable to accommodate cases of different lengths and also of different overall height, including any projecting height of the bottles or other contents. For example, the machine may be adjusted for cases measuring from 15 inches to 24 inches in length, and from 7¼ inches to 13 inches in height, formed of wood, fiber, cardboard, or other materials. The cases are handled one at a time, no matter how frequently they are supplied to the machine, and they are unpacked and the empty cases are discharged from the machine in one direction, that is, along the cross bar of the T. The bottles or other articles that have been removed from the cases are transferred and fed out of the machine in a direction at right angles to the case feed, i. e., in a direction corresponding to the vertical bar of the T, for further processing.

Referring particularly to Fig. 3, the case conveyor 13 comprises two parallel roller chains 17, passed over sprocket 18 at one end and sprocket 19 at the other end, these sprockets being mounted on the shafts 20 and 21, respectively, suitably journalled in bearings carried by sub-frames 22 and 23, respectively, mounted on the base 10. The roller chains 17 are driven at constant speed, such as 16 inches per second, by a motor 24 carried by sub-frame 22 and driving sprocket shaft 20 through reducing gearing housed in gear box 25.

Positioned adjacent the case infeed at the right-hand side of Figs. 3 and 4 and extending along one side of the conveyor 13 is a vertical case guide 26 terminating in a vertical stop 27 disposed at right angles to the direction of travel of the case, which is from right to left, as indicated by the arrows in Figs. 3 and 4. Normally forming part of the case guide 26 is a paddle-like case ejector plate 28 secured at one end to the vertical shaft 29 and terminating at its free end at a point adjacent the stop 27. The lower end of case release shaft 29 is fitted with a crank 30 connected to the piston 31 of a hydraulic cylinder 32 pivoted on a bracket 33 secured to the bed 34 of the conveyor 13.

One end of cylinder 32 is connected to the pressure line and the other to a return line respectively leading to and from the corresponding sides of the two position solenoid-operated valve 60 mounted on the sub-frame 23 of the machine. Solenoid valve 60 is of conventional construction wherein two solenoids 60a and 60b are provided, one for each of the two operations which the cylinder 32 is intended to perform and is of the monetary contact type wherein the positions of the valves are maintained after removal of the energizing voltage until the opposing solenoid is energized. Thus, for one position of the solenoid valve 60, pressure fluid is supplied to one side of the piston in cylinder 32 to move the case ejector plate 28 toward the conveyor 13 to perform its case ejecting function, and in the other position of the solenoid valve 60, the ejector plate 28 is held in line with guide 26 as shown in phantom in Fig. 3.

The primary or motion initiating solenoid on the valves hereinafter referred to will be identified by the suffix "a" and the secondary or return or restoring solenoid will be identified by the suffix "b." Operation of the solenoid valve 60 and similarly-constructed solenoid valves will be explained in connection with circuit diagram of Fig. 8, it being understood that the hydraulic pressure and return lines, which receive pressure fluid and return the same in a conventional system including the pump 39 driven by motor 40 and reservoir 41 (Fig. 1) are omitted to maintain clarity of illustration. The aforementioned hydraulic supply system serves the case conveying, elevator and bottle gripping mechanisms, the bottle transferring mechanism having its own hydraulic supply system.

Positioned ahead of the case conveyor 13, that is, at the infeed side thereof, shown at the right of Figs. 3 and 4, is a conveyor 36 composed of rollers 37 journalled in suitable side rails 38 in a conventional way except that the rollers 37 adjacent the conveyor 13 are slanted at an angle to the general direction of travel of the case conveyor 13 so that case A entering the case conveyor 13 is urged against the composite guide plate 26—28 so as to travel therealong until the corner of the case strikes stop 27 where it is held, with the conveyor chains 17 dragging over the underside of the case, but not moving the same because of its lodgement against stop 27. The ejector plate 28 is adapted to be operated at the proper time in a manner to be described to dislodge the case from the stop 27 for further forward movement by conveyor 13 into the apparatus for unpacking of its contents.

Positioned between the chains 17 and slightly below the level of the case conveyor 13 so that the case A travelling on conveyor 13 does not engage it, is the platform 43 of elevator 15. Platform 43 is secured to the upper end of the piston 44 hydraulically raised and lowered within cylinder 45 carried by bracket 46 bolted to the bed 34 of the conveyor, as best shown in Fig. 5. The supply of pressure fluid from pump 39 to elevator cylinder 45 for the purpose of raising the elevator platform 43 above the surface of the conveyor to cause the platform 43 to engage and elevate a case A, as well as the return of the fluid from cylinder 45 to reservoir 41, is regulated by solenoid valve 47 mounted on the sub-frame 23 and is similar to previously-described solenoid valve 60. The hydraulic pipes 48 leading to and from cylinder 45 are not shown extended to solenoid valve 47 in the interest of clarity. Initiation of operation of solenoid valve 47 will be described.

Pivoted at opposite sides of the elevator 42 on cross shafts 49 and 50 journalled in the bed 34 of the case conveyor 13 are the case centering arms 51 and 52, respectively. The open space between each centering arm and the corresponding side of elevator platform 43 is closed by a stationary shield 53. As shown especially in Figs. 3 and 4, shafts 49 and 50 are fitted with respective pinions 54 and 55 engaged by corresponding racks 56 and 57 held in mesh therewith by rollers 58. Racks 56 and 57 are connected to the piston of hydraulic cylinder 59 controlled by solenoid valve 35 mounted on the sub-frame 23 and having the two solenoids 35a and 35b similar to solenoid valve 60 for energization by means to be described.

When fluid under pressure is supplied from pump 39 to the hydraulic cylinder 59, through solenoid valve 35, the arrangement of the racks 56 and 57 causes opposite rotation of shafts 49 and 50 to swing centering arms 51 and 52 upwardly towards each other in a forceps-like movement to engage the opposite ends of the case A disposed above the elevator 15, as indicated in phantom in Figs. 4 and 5. This action properly holds and centers the case over the elevator platform 43 and aligns it with the bottle grippers positioned vertically overhead, as will be described.

As the centering arms 51 and 52 are swung up to engage the ends of the case A as described, a detent 65 carried by rack 57 engages the lever 66 of a conventional limit switch 67 to energize solenoid valve 47 to raise elevator platform 43. Plate 67' carrying switch 67 is adjustable along conveyor bed 34, so as to accommodate cases of different maximum lengths.

Positioned in a horizontal plane above the conveyor 13 and ahead of the elevator 15 is a photoelectric switch 61 on which is directed a light beam from light source 62 positioned on the opposite side of the conveyor 13, as shown in Figs. 3 and 4.

Positioned further along the conveyor 13 than the first photoelectric switch 61 and just to the left of the center of the elevator 15 as seen in Figs. 3 and 4, is a second photoelectric switch 63 cooperating with the light source 64 on the opposite side of the conveyor 13, as shown in Figs. 3 and 4. Thus, as the case proceeds, it initially intercepts the light beam directed on photoelectric switch 61 and then intercepts the light beam on photoelectric switch 63, which remains interrupted while the case is held by centering arms 51 and 52, whereas the beam on photoelectric switch 61 is restored by that time.

Photoelectric switch 61 controls solenoid valve 35 and causes the centering arms 51 and 52 to rise and engage the opposite ends of the case which will have been carried slightly further by that time by the conveyor 13.

When the centering arms 51 and 52 have engaged the case A, detent 65 trips limit switch 67, thereby energizing solenoid valve 47 which causes the elevator 15 to rise, engage its platform 43 with the bottom of the case centered thereover and lift the case clear of the conveyor 13, while still being engaged by the centering arms 51 and 52. The centering arms 51 and 52 are not restored until the case has risen beyond them in a manner to be described.

If a case is overlength, detent 65 does not trip limit switch 67 and, after a time delay to be described elapses, the arms 51 and 52 are retracted to allow case A to go through the machine unpacked.

The elevator platform 43 carries a vertical guide 68 having at its lower end a laterally projecting switch dog 69 adapted to trip the lever 70 of limit switch 72, shown in Fig. 5, the switch being tripped when the elevator 15 reaches its high position.

Positioned immediately above the case rising on the elevator 15 and in alignment therewith, is the case stripper which is shown in plan in Fig. 6 and comprises a rectangular sheet metal frame 76 having a central opening 77 slightly smaller in dimension than the interior dimension of the case, but not sufficiently smaller to interfere with the withdrawal of bottles therefrom. Extending across the opening 77 and secured at its upper edge to the frame 76 is a bar adapted to engage the honeycomb partition separating the bottles in the case so as to preclude sticking of the partition to the bottles when they are separated in the manner to be described.

Preferably, curved flanges are secured by welding to the underside of the frame 76 of the stripper 75 and are particularly adapted to fold back the flaps from cardboard containers. These curved flanges are designated 79 and are shown in the cross-section of the stripper constituting Fig. 6A. The curvature of the flanges 79 is such as to fold down the flaps on the carton and hold them out of the way during the unpacking operation.

The stripper 75 is provided at its upper sides with pins 80 which are journalled in ball bearings 81 carried on the upper ends of vertical bars 82 slidably mounted in suitable guides 83 on the frame 12 of the machine so that the stripper 75 is free to tilt angularly about its bearings 81 and is positioned upwardly by the case as it rises with the elevator, and falls by gravity with the case as the elevator descends in the manner to be described, meanwhile stripping the carton or case from the bottles and also the honeycomb partition therefrom by means of bar 78.

The transfer carriage 16 is provided with article holding members 18, which are essentially gripping jaws operative to grip the individual articles, such as bottles, hold them as the articles are being transferred by the carriage 16 and then release them at the point of deposit.

In the bottle-receiving position of the transfer carriage 16, its article grippers 85 are axially aligned with the necks of the bottles in the case A centered on the elevator 15 which is rising to insert the bottles within the open grippers 85 on the carriage 16. The particular construction of the grippers 85 forms no part of the present invention, and details of their construction may be had upon reference to said copending application, wherein the grippers are shown mounted on a vertically movable carriage on which they are laterally adjustable to vary the spacing between the grippers to accommodate the particular spacing of the bottles in the containers to be unpacked. In the present apparatus, the carriage 16 is preferably fitted with such space-adjusting means between the grippers 85 for the same reason.

Hydraulic means operating in the manner described in said copending application actuates the grippers, and in the present invention, the initiation of the flow of the hydraulic fluid for actuating the grippers 85 is effected by limit switch 72, shown in Fig. 5 as it is tripped by the dog 69 carried by the elevator guide 68 as previously described in connection with Fig. 5, the actual control of the hydraulic fluid being effected by solenoid valve 86 mounted on the base 10, as shown in Fig. 1 and operating like solenoid valves 35, 47 and 60, previously described. A time delay mechanism is involved in the operation of the grippers 85 which will be described in connection with Fig. 8.

After the grippers 85 are actuated to grip the bottles, the aforementioned time delay mechanism causes reenergization of solenoid valve 47 to reverse the hydraulic fluid flow in elevator cylinder 45 so that elevator 15 descends, carrying the case with it while leaving the bottles suspended in the grippers 85 of the carriage 16.

Solenoid valve 60 is electrically connected to solenoid valve 47 and is energized at the same time, thereby reversing the flow of hydraulic fluid to cylinder 59, causing the centering arms 51 and 52 to retract below the surface of conveyor 13, thus restoring the limit switch 67 to its original position.

The stripper 75 descends by gravity as the elevator 15 descends, thus stripping the case and any of the partitions that tend to adhere to the suspended bottles. As the stripper 75 descends, its right-hand guide 82 engages the lever 71 of limit switch 73 at the lowermost point of the stripper. This actuation of limit switch 73 energizes solenoid valve 100 located on the base 10 and supplying hydraulic fluid under pressure to carriage transfer cylinder 93, to move transfer carriage 16 and the suspended bottles horizontally over and along the bottle outfeed conveyor 14 in the manner to be described. The pressure fluid is supplied to the transfer cylinder 93 by a pump 94 driven by a motor 95, mounted on the base 10 of the machine.

In the event that the stripper 75 does not descend with the carriage by reason of the partition or a case being jammed against or otherwise adheres to one or more suspended bottles, the limit switch 73 is precluded from actuation by the stripper guide 82 and fluid is not transmitted to transfer cylinder 93 by solenoid valve 100. Consequently, the carriage 16 will not be moved until the stripper 75 is released manually by dislodging the stuck case or partition from the suspended bottles to thereupon trip limit switch 73 to perform its intended function as described.

The carriage 16 is supported by rollers 87 and 88 engaging in tracks 89 mounted at either side of the carriage on the upper frame 90 of the machine and extending substantially horizontally above the bottle outfeed conveyor 14. At two points, the track 89 is depressed at 91 and 92 for temporarily lowering the carriage 16 as the respective rollers 87, 88 engage the dips 91 and 92 of the track 89, and then rise to the original level toward the end of the course of travel of the carriage 16, the extreme position being shown by the right-hand phantom line indicating that position in Fig. 1.

Carriage 16 is moved along track 89 by the piston of an hydraulic cylinder 93 mounted on upper frame 90 by brackets 94. The head 95, rigidly connected to the piston, is coupled by links 96 to the carriage 16, so that as the head 95 is driven to the right in Fig. 1 along guide rails 97, links 96 draw the carriage to the right. As the carriage rollers 87 and 88 pass through the dips 91 and 92 in the track 89, the carriage descends to the position indicated in phantom in Fig. 1, and then rises again to its normal horizontal level at the extreme extended position of the transfer cylinder piston.

The bottle outfeed conveyor 14 is a simple mesh chain conveyor belt moving in the direction of the arrow shown in Fig. 1 and driven by a pulley 102 from a motor 95 through reducing gearing 140 mounted on the base 10 of the machine and connected by vertical shaft 105 to the aforementioned pulley 102, proper tautness of the conveyor belt 14 being maintained by suitable idler pulleys 106. Suitable supporting plates 107 immediately below the bottle outfeed conveyor belt enable the belt to remain level and it will be seen from Fig. 1 that the belt moves around the opposite ends of the supporting means 107.

Just before the carriage 16 reaches its lowermost position in the dips 91 and 92 of track 89, the head 95 trips limit switch 110 supported on the top frame 90 of the machine. Limit switch 110 reactuates solenoid valve 86 to open grippers 85 so that the bottles are dropped vertically a fraction of an inch onto the bottle outfeed conveyor 14 which is driven at the same rate of speed at which the carriage 16 is moving in its lowermost position when the bottles are released by grippers 85. Hence, there is no acceleration or deceleration of the bottles relatively to the outfeed conveyor 14 and the bottles do not tip over in consequence. Also, since the bottle outfeed conveyor 14 and the carriage 16 move horizontally at the same speed, the grippers 85 rise as the carriage 16 rises from the dips 91 and 92 without horizontal displacement relatively to the bottles, which, even after being released, are still inserted slightly within the grippers 85 before the latter have been restored to the normal high elevation of track 89 indicated by the phantom line in Fig. 1 at the extreme right-hand carriage position. The carriage 16 remains in the extreme right-hand position for a time predetermined by a time delay relay to be described, in order to permit the released bottles to travel away from grippers 85 toward the discharge end of the bottle outfeed conveyor 14 so that the returning carriage does not encounter the bottles when it dips at 91 and 92. At the end of the time delay, solenoid valve 100 is energized to supply hydraulic fluid to transfer cylinder 93 to return the carriage 16 to its centered position over elevator 15, as shown in solid lines in Fig. 1.

As the elevator 15 reaches its lowermost position with its platform 43 position slightly below the upper surface of the conveyor 13, as shown in Fig. 5, a detent 101 on the guide 68 engages lever 70 of limit switch 72, thereby restoring the latter to its original position. The centering arms 51 and 52, having been retracted below the surface of the conveyor 13, at the beginning of the descent of the elevator 15 as previously described, the elevator 15 redeposits the empty case A on the conveyor 13 to be carried out of the machine toward the left of Figs. 3 and 4. As the rear end of the empty case A clears the light beam on photoelectric switch 63, solenoid valve 60 is energized to cause cylinder 32 to actuate ejector plate 28 to eject the next filled case from behind stop 27 for movement into the machine to repeat the case transfer cycle just described.

Safety means are provided precluding deposit of another load of bottles on the bottle outfeed conveyor 14 before the bottles from the previous load have been discharged therefrom, such as when the subsequent processing apparatus, like a bottle washer, becomes overloaded or jammed. These safety means include a photoelectric switch 111 positioned adjacent the outfeed conveyor and located immediately above it with a corresponding light source, not shown, being positioned along the opposite side of the outfeed conveyor like light sources 62 and 64 are positioned on opposite sides of the case conveyor in Figs. 3 and 4.

Interruption of the light beam on the photoelectric switch 111 for a predetermined time longer than is required for the bottles deposited by carriage 16 on conveyor 14 to be carried thereby past the light beam, causes photoelectric switch 111 to energize solenoid valve 35 to actuate cylinder 32 to retract case ejector plate 28 and expose stop 27, thereby preventing the next case from entering the machine. When the jam in the outfeed of bottles by conveyor 14 is cleared, the resulting restoration of the light beam on photoelectric switch 111 causes the reverse flow of hydraulic fluid to cylinder 32 and actuation of ejector plate 28 to release the next case into the machine.

Another safety feature is afforded by limit switch 112 mounted on the top frame 90 of the machine (Fig. 1) and opened by the carriage 16 on its initial outward movement from over the elevator and closed when the carriage 16 returns to that position. This opening of limit switch 112 disables the elevator raising solenoid valve 47, so that it cannot operate unless the carriage 16 is aligned with the elevator 15.

Another safety feature is provided in the event that a bottle projects too high by being tilted or by resting on some object in the bottom of the case, or if the entire case is too high to be accommodated by the transferring mechanism. It, or the projecting object strikes a case height gauge plate 115, shown in Figs. 2 and 4, positioned over the case conveyor 13 at a point a short distance beyond the stop 27 for engagement by an overheight case after it has been released by the ejector plate 28 for entry into the apparatus. The case height gauge 116, including the plate 115, is mounted on the frame 12 of the apparatus at the position shown in Fig. 2, and as shown in Fig. 7 which is an enlarged vertical section therethrough. The gauge 116 comprises a housing 117 in which a shaft 118 is a high pitch worm wheel 119 engaging the worm 120 splined on shaft 121 which is rotatable by handwheel 122 to tilt the plate 115 and thereby vary the elevation of its lower edge above the case conveyor 13. Worm 120 is normally urged axially of shaft 121 toward the left-hand wall of housing 117 by a spring, not shown.

Meshing with a cylindrical rack 123 rigidly connected to worm 120 is high pitch gear segment 124 pivoted in housing 117 about pivot pin 125 and keeping normally closed limit switch 126 in an open position. Movement of gauge plate 115 by an overheight case engaging it, causes worm 121 and cylindrical rack 123 to slide to the right in Fig. 7, thereby rotating segment 124 to close limit switch 126 and operate a time delay switch to be described. This action disables the case centering means so that the case centering arms 51 and 52 remain below the surface of the conveyor 15 and the overheight case is discharged from the machine without being unpacked, since the remaining functions of the machine are tied in with the operation of centering arms 51 and 52.

A further safety feature is provided in the event that the top of the case is closed, as may happen when the operator neglects to open the case flaps before the cases are fed into the machine. In this event, the elevator 15 will not rise to its top position, since the upward travel of the case is stopped by the grip fingers 85 striking the closed top of the case. Accordingly, limit switch 72, which initiates the time delay at the end of which solenoid valve 47 causes the elevator to descend, is not tripped. The safety feature comprises a time delay relay to be described later, which energizes solenoid valve 47 to lower the elevator, whenever a case remains in the machine for more than a predetermined time, as measured by interruption of either one of the light beams serving photoelectric switches 61 and 63 respectively.

The centering mechanism may consist merely of the leading centering arm while the trailing centering arm is omitted. The leading centering arm thus acts as a stop for holding the case centered with respect to the carriage 16, providing the cases are all of the same length. This modification is illustrated in Fig. 9, wherein the rack 57 of Fig. 4 is replaced by a straight bar 57' guided between rollers 58', and carrying the detent 65' for engaging the lever 66' of limit switch 67''. As stated, the trailing arm 52, shaft 50, and pinion 55 of Fig. 4 are omitted, but otherwise the arrangement remains the same.

In operation of the single stop arm modification of Fig. 9, the reenergization of the first photoelectric switch 61 when the case A advances past it causes solenoid valve 32 to effect operation of hydraulic cylinder 59' to retract rack 56', which rotates pinion 54' in a clockwise direction to raise arm 51' to the dotted line position into the path of the case A to stop the same in vertical alignment with the carriage 16. Meanwhile hydraulic cylinder 59' has also moved bar 57' to cause detent 65' carried thereby to engage lever 66' and thereby close limit switch 67'' to energize solenoid valve 47 and cause the elevator platform 43 to elevate the case A in the manner previously described. Accordingly, in the modification of Fig. 9, the leading arm 51' acts as a stop and means for holding the case centered with respect to the carriage 16, in instances where the incoming cases are all of the same length.

The mechanical operation of the article transfer apparatus of this invention has been described, but will be reviewed in connection with the electrical diagram constituting Fig. 8. Assuming that the articles to be transferred are empty beverage bottles contained in the honeycomb partitioned case A, the centering arm spacing will have been adjusted to accommodate cases of the length of the case A without regard to height of the case except in so far as taller bottles or a projecting bottle might trip height gauge 116.

When the machine is clear and ready to receive a case A for unpacking, the switches, relays and photoelectric switches are in the position shown schematically in Fig. 8. Time delay relay 213 is energized from line 200 and wire 215 through photoelectric switch 111, which is in the "light on" position, since there are no bottles on bottle conveyor 14, and relay contacts 214 are therefore closed and held closed by time delay device 222, such as a dash pot, for a predetermined time after relay 213 is deenergized as will be described. Time delay device 222 is of the "off delay" type, closing immediately on energization of relay 213, but holding when relay 213 is deenergized or "off." The inverted dash pot symbol indicates an "off" delay unit.

Photoelectric switches 61 and 63 are also in the "light on" position, since no case is in the machine. The centering arms 51 and 52 are retracted below the surface of case conveyor 13, and switch 67 is therefore in the "centering arms out" position. The stripper 75 is in its lower position and stripper switch 73 is in the "stripper down" position.

Double throw relay 211 has two normally closed contacts 220 and 221 and three normally open contacts 210, 217 and 218, which are closed when relay 211 is energized from line 200, wire 228, stripper switch 73, wires 241 and 250, centering arm limit switch 67, photoelectric switches 61 and 63 and contacts 214 of relay 213 to line 201. When relay 211 closes contacts 210, 217 and 218, it simultaneously opens contacts 220 and 221. Closure of contacts 210 by relay 211 energizes relay 202 from line 200, wires 208 and 209, contacts 210, wire 212 and line 201, resulting in closure of the four normally open contacts 203, 204, 205 and 206 and opening of normally closed contact 236. Once relay coil 202 has been energized over contacts 210 of relay 211 in the manner described, it will continue to remain energized even after relay 211 is deenergized and contacts 210 are opened, because its circuit is closed over a secondary or holding path from line 201 through its own contacts 206, wire 251, contacts 252 of time delay relay 253, wire 255, contacts 246 of time delay relay 245, wire 239, contacts 238 of time delay relay 231 and wires 234, 209 and 208 to line 200. When this holding path is interrupted anywhere, relay 202 will be deenergized, and will not be reenergized until relay 211 is energized. The relay 245 is of the "on delay" type, wherein the delay unit 247 delays closing of the relay contacts after the relay is energized. The "on delay" type is indicated by an upright or open top dash pot symbol.

Solenoid coils 47b and 35b are energized from line 200 through wires 208, 209, closed contacts 217 and wire 237 to line 201, causing the elevator to remain in the "down" position thus holding switch 72 open, and causing the centering arms to remain retracted, respectively.

Closure of contacts 218 causes solenoid 60a to be energized from line 200, wires 208 and 209, contacts 218, and line 201, thus actuating case ejector plate 28 so as to release a case from stop 27 for movement into the machine by conveyor 13.

Relays 243 and 231 are not energized and in consequence, solenoid 86b is energized from line 200, wires 208, 209 and 234, closed contacts 233 of relay 231 to line 201, with the result that grip fingers 85 of carriage 16 are maintained in the open position. Similarly, the deenergized condition of relays 231 and 243 causes solenoid 100b to be energized from line 200, wires 208, 209 and 234, closed contacts 242 and 240 of relays 243 and 231, and wire 248, with the result that carriage 16 is maintained in the position over the elevator 15.

It should be noted that the machine will automatically assume this starting position upon application of power, regardless of the previous position of switches and relays, as will become evident as the description of the unpacking cycle proceeds.

As the case A is released from stop 27 by ejector plate 28 and is carried by conveyor 13 into the machine, it interrupts the light beam serving photoelectric switch 61 thereby breaking the circuit of relay 211 to deenergize solenoid 60a and energize solenoid 60b through contacts 220 so that case ejector plate 28 is retracted to expose stop 27 and prevent entry of a succeeding case as previously described, and solenoids 35b and 47b are deenergized. However, relay 202 is not deenergized by the opening of contacts 210 of relay 211 but remains energized because of the aforementioned holding path. The case proceeds and interrupts the light beam of photoelectric switch 63, without immediate effects, since relay coil 211 which it controls is already deenergized.

As the case continues to travel on conveyor 13, its trailing edge clears the light beam for photoelectric switch 61, which accordingly is restored to the "light on" position. With relay 202 still energized and relay 211 deenergized, solenoid coil 35a is energized from line 200, wire 228, stripper switch 73, wires 241 and 250, centering arm switch 67, photoelectric switch 61, and closed contacts 203 and 221 of respective relays 202 and 211. Accordingly, solenoid 35a causes hydraulic fluid flow to cylinder 59 which raises the centering arms 51 and 52 into engagement with the case and center it above the elevator platform 43.

If the case is of the proper length for which the machine has been adjusted, the motion of the centering arms actuates limit switch 67 in the manner previously described in connection with Fig. 4. Limit switch 67 is moved to the "centering arms in" position 67' to complete a circuit from line 200, wire 228, stripper switch 73, wires 241 and 250, contact 67' of the said switch 67, wire 225, closed contacts 204 of relay 202, switch 112, provided the latter is closed by reason of the carriage 16 being in position over elevator platform 43, wire 227 and solenoid 47a to line 201, solenoid 47b having been deenergized as described. Energization of solenoid 47a results in raising the elevator 15 whose platform 43 lifts the case A from the conveyor 13, against the friction of centering arms 51 and 52, still engaging the case. Operation of switch 67 also deenergizes solenoid 35a.

If the case is longer than normal, the centering arms 51 and 52 do not rotate far enough to actuate limit switch 67 and solenoid 47a, controlling ascent of the elevator is not energized, so that the case remains held on the conveyor 13 by arms 51 and 52. In this event, time delay relay 253 comes into action, being energized from line 200, wires 208, 209 and contacts 220 of deenergized relay 211. The time delay unit 254 of relay 253 is set for a value exceeding the time during which a normal case remains in the machine to interrupt the light beams for photoelectric switches 61 or 63, or both. Normally, a case leaves the machine before the "on delay" unit 254 of relay 253 releases, and the latter is deenergized upon energization of relay coil 211 by restoration of the light beams, and restarts its timing cycle upon entry of the succeeding case. If, however, a case remains in the machine for an excessive length of time, the "on delay" unit 254 releases to open contacts 252, thus breaking the holding path for relay 202 and deenergizing the latter. Solenoid coil 35a is deenergized by opening of contacts 203 of relay 202 and solenoids 60b and 47b are energized by closure of contacts 236 from line 200 and wire 237 to line 201. Energization of solenoid 60b causes centering arms 51 and 52 to retract and the case is released to be carried by conveyor 13 out of the machine without being unpacked. As it moves toward discharge, the case restores the light beam from photoelectric switch 63 and the machine assumes its starting position ready to admit the next case, as described above.

It should be noted that interruption of either of the light beams directed on photoelectric switches 61 and 63 as well as interruption of the light beam on photoelectric switch 111 for a period of time exceeding the time delay interval predetermined by time delay unit 222 of relay 213 results in deenergization of relay coil 211, opening of contacts 218 and closure of contacts 220 thereof. In this event, solenoid 60a is deenergized and solenoid 60b is energized, causing the case ejector plate 28 to retract and expose stop 27, so that the next filled case comes to rest against stop 27. This safety feature precludes admission of a new case, as long as the preceding case is still in the machine as evidenced by interruption of the light beams directed on photoelectric switches 61 or 63, or as long as a jam exists on bottle conveyor 14 resulting in prolonged obstruction of the light beam for photoelectric switch 111.

If the entering case is of excessive height, or its contents extend beyond the level set by the height gauge plate 115, the latter, which is located slightly ahead of photoelectric switch 61, is engaged by the case and closes limit switch 126, thus energizing relay 245. Contacts 246 open immediately and, by virtue of the "off delay" unit 247, remain open even after the case has passed under gauge plate 115 and switch 126 has been reopened, for the duration of the time delay, which exceeds the time required for the case to travel to the location of the light beam for photoelectric switch 61. As soon as this light beam is interrupted by the centering case, relays 211 and 202 are deenergized, the latter because of its holding path being broken at contacts 246. Solenoid 35b is energized as described above in connection with an overlength case, the centering arms 51 and 52 remain in the retracted position, and the case proceeds through the machine and is discharged without being unpacked.

Assuming the case to be of proper dimensions, it is raised by elevator 15 as described above. At some point on its upward travel, the case engages the stripper 75 and lifts it off its supports, at the same time operating switch 73, which transfers to the "stripper up" position. The elevator 15 with the case resting on its platform 43 and stripper 75 resting on the case, continues its upward travel to the end of the stroke of elevator cylinder 45, reaching the position shown in Fig. 1. When the elevator 43 reaches its uppermost position, the heads of the bottles enter the open grippers 85 and dog 69 on elevator guide 68 trips limit switch 72, which transfers to the "elevator up" position. A circuit from line 200, wire 228, switch 73, wire 229, switch 72 and wire 230 is closed to energize relay 231, which closes contacts 233' and 240' and opens contacts 233 and 240 while contacts 238' are held open by time delay unit 232'. Closure of contacts 233' completes a circuit from line 200, wires 208 and 209, contacts 233', wire 235 and line 201 to energize solenoid 86a. Solenoid coil 86b is simultaneously deenergized by the opening of contacts 233. Energization of solenoid 86a causes the grippers 85 to close and grip the heads of the bottles. At the same time, the opening of contacts 240 of relay 231 breaks the circuit to solenoid 100b which caused the carriage 16 to assume its position over the elevator. However, the carriage 16 will not move at once, because of the momentary contact construction of the solenoid valves, until solenoid 100a is energized as will presently be explained.

Closure of contacts 240' of relay 231 creates a holding path for the relay 231 from line 200, wires 208 and 209 and contacts 242 and 240' so that relay 231 will remain energized even after the original energizing contact created by switches 72 and 73 is broken.

After the time delay of relay 231 runs out, contacts 238' are closed and contacts 238 are opened, the latter breaking the holding circuit of relay coil 202, which becomes deenergized and opens contacts 203, 204, 205 and 206. Opening of contacts 204 breaks the circuit for solenoid 47a. At the same time, solenoids 47b and 35b are energized from line 200, wire 208, contacts 236 and wire 237 to line 201. Energization of coil 47b causes the elevator 15 to descend with the case resting on its platform 43, stripping the case from the bottles which are suspended from the grippers 85. The weight of stripper 75 resting on the case assists in freeing the case and the honeycomb partition from the bottles.

Energization of coil 35b results in retraction of centering arms 51 and 52 below the surface of conveyor 13 and concomitant restoration of switch 67 to the "centering arms out" position.

The aforementioned delayed action of relay 231 by time delay unit 232' is required to allow the grippers 85 sufficient time to engage the bottles securely, before elevator 15 begins its descent with the case being emptied by withdrawing downwardly from the suspended bottles.

The elevator 15 continues to travel downwardly and finally redeposits the empty case on conveyor 13, which carries the case out of the machine. The elevator 15 then continues its downward motion to the rest position of its platform 43 slightly below the level of conveyor 13. Detent 101 on elevator 15 (Fig. 5) trips switch 72 and restores it to the "elevator down" position, without effect upon relay 231, which remains energized over the previously described holding path.

If the top of the case, such as the flap of a carton, has not been opened before entry into the machine, the elevator 15 will not reach its topmost position, since the closed top of the case will engage the grippers 85 depending from carriage 16, and consequently, dog 69 (Fig. 5) will not engage switch 72 which will not be closed. If this condition persists for a length of time exceeding the time delay of relay 253, contacts 252 open, thereby breaking the holding circuit of relay 202. Deenergization of relay 202 causes the elevator 15 to redescend and the centering arms 51 and 52 to retract and the unpacked case is redeposited on the conveyor 13 to be carried out of the machine in the manner previously described in connection with a normal operation.

Adverting to normal operation, an empty case leaving the machine on conveyor 13 clears the light beam for photoelectric switch 63 and time switch 73 has been restored to the "stripper down" position, as will be explained. Relay 211 is energized from line 200, wire 228, switch 73, wires 241 and 250, limit switch 67, photoelectric switches 61 and 63, contacts 214 of relay 213 to line 201. Relay 202 is energized over contacts 210 as previously described. Relays 211 and 202 are thus restored to the starting position. Solenoid 60a is energized from line 200, wires 208, 209, contacts 218 and wire 219 to line 201, and the next filled case is admitted into the machine.

During the down travel of the elevator 15 the stripper 75 descends with it and its guide 82 operates switch 73 and transfers it to the "stripper down" position, which closes a circuit from line 200, wire 228, stripper switch 73, wire 241, closed contacts 238' of relay 231, and wire 244 to line 201 to energize solenoid 100a. Energization of solenoid 100a supplies hydraulic fluid to transfer cylinder 93 to cause the carriage 16 to move over and parallel to conveyor 14. Limit switch 112 is engaged by piston 94 to be opened without immediate effect, because the circuit for solenoid 47a was broken at contacts 204. However, the elevator 15 is precluded by switch 112 from rising again, until switch 112 is reclosed by the returning carriage 16.

The foregoing assumes that the case is cleanly stripped from the bottles suspended on carriage 16, but if the case or the honeycomb partition adhere to bottles and do not descend with the elevator 15, stripper 75 is held in the high position and switch 73 is not closed, but remains in the "stripper up" position. Consequently, solenoid 100a will not be energized to initiate movement of the carriage 16 which thus remains at rest until the case or partition are freed manually, allowing stripper 75 to drop and operate switch 73.

As the carriage 16 with the bottles gripped in grippers 85 descends into the track dips 91 and 92, limit switch 110 is momentarily closed by the head 95 tripping the arm of switch 110, thereby energizing "off delay" relay 243 from line 200, switch 110 to line 201. Opening of contacts 242 of relay 243 breaks the holding circuit of relay coil 231, which becomes deenergized. Contacts 238', 233' and 240' open immediately, while contacts 238, 233 and 240 close immediately. Solenoid 86a is deenergized and solenoid 86b is energized from line 200, wire 208, 209 and contacts 233 to line 201, thus causing the grippers 85 to open and deposit the bottles on conveyor 14. Similarly, solenoid coil 100a is deenergized, but solenoid coil 100b is not yet energized, since its circuit is broken at contacts 242 as a consequence of the "off delay" unit 243' of relay 243. Because of the momentary contact construction of the solenoid valves, the carriage 16 proceeds through the track dips 91 and 92 and rises again at the end of its travel.

It should be noted that switch 110 is closed only when the switch arm is engaged by the head 95 of the carriage 16 going from the position over the elevator 43 to the position over the bottle conveyor 14. On the return travel of the carriage, the switch arm is also tripped by head 95 but the construction of the switch is such that the contacts are not closed.

The deposited bottles now travel on conveyor 14 and briefly interrupt the light beam of photoelectric switch 111. Under normal conditions, the light beam is restored before the contacts 214 of relay 213 open, because of the "off delay" action of unit 222. If the light beam of photoelectric switch 111 is interrupted for an abnormal length of time, because of a bottle jam on conveyor 14, delay unit 222 releases and contacts 214 open, deenergizing relay 211 and thus preventing entry of a new case into the machine, as previously explained.

The time delay unit 243' of relay 243 releases after all the bottles have passed underneath the carriage 16, which remained at the end of its travel at the right in Fig. 1. When delay unit 243' releases after expiration of its time delay, contacts 242 close, thereby energizing solenoid 100b from line 200, wires 208, 209, contacts 242 and 240, wire 248 to line 201, whereupon transfer cylinder 93 is actuated to return carriage 16 to its starting position over the elevator 15. On the return stroke, head 95 trips the arm of switch 110 but does not close the switch, as previously explained.

In the meantime, a new case has been admitted to the machine and has proceeded up to the point where it is held over elevator platform 43 by raised centering arms 51 and 52. However, the elevator 15 cannot rise, since the circuit for solenoid 47a is broken by switch 112. When the carriage 16 returns to the position over the elevator 43, switch 112 is closed to energize elevator-raising solenoid 47a and the cycle repeats.

Although a preferred embodiment of the invention has been illustrated and described herein, it is to be understood that the invention is not limited thereby, but is susceptible of changes in form and detail within the scope of the appended claims.

I claim:

1. In apparatus for transferring regularly-arranged articles from a case, the combination of a carriage having a plurality of article-holding members regularly arranged thereon in conformance with the regular arrangement of said articles in said case, an elevator for the support positioned below said carriage, motive means for actuating said elevator to raise said case and connect said articles with the corresponding article holding members, a stripper interposed between the case and said carriage for stripping the case parts from said articles connected to the corresponding article holding members as the elevator descends, motive means for moving said carriage and suspended articles from vertical alignment with said case, means responsive to the descent of said stripper, and operative connections between said responsive means and said last-named motive means for energizing said last-named motive means.

2. In apparatus for transferring regularly-arranged articles from a case, the combination of a carriage having a plurality of article-holding members regularly arranged thereon in conformance with the regular arrangement of said articles in said case, an elevator for the support positioned below said carriage, motive means for actuating said elevator to raise said case and connect said articles with the corresponding article holding members on said carriage, a stripper interposed between the case and said carriage for stripping the case parts from said article as the elevator descends, motive means for moving said carriage and suspended articles from vertical alignment with said support, means responsive to the descent of said stripper, operative connections between said responsive means and said last-named motive means for energizing said last-named motive means, time delay means responsive to delay in descent of said stripper, and operative connections between said time delay means and said last-named motive means for disabling the same after a predetermined delay in descent of said stripper.

3. In apparatus for transferring regularly-arranged articles from a case, the combination of a carriage having a plurality of article-holding members regularly arranged thereon in conformance with the regular arrangement of said articles in said case, a conveyor for the case positioned below said carriage, a stop adjacent said conveyor, motive means for advancing said stop in the path of said case moving on said conveyor to halt the same in alignment with said carriage, means responsive to the movement of the case on said conveyor, operative connections between said responsive means and said motive means for energizing said motive means to advance said stop and halt said case, an elevator for said case, motive means for actuating said elevator, means responsive to the movement of said stop, operative connections between said last-named responsive means and said elevator motive means for energizing said elevator motive means to raise said case and connect said articles with the corresponding article holding members on said carriage, time delay mechanism, and operative connections between said mechanism and said stop and between said mechanism and said elevator motive means for reactivating said elevator motive means to lower the case and disengage the same from said articles held by said carriage.

4. In apparatus for transferring regularly-arranged articles from a case, the combination of a carriage having a plurality of article-holding members regularly arranged thereon in conformance with the regular arrangement of said articles in said case, a conveyor for the case positioned below said carriage, a stop adjacent said conveyor, motive means for advancing said stop in the path of said case moving on said conveyor to halt the same in alignment with said carriage, means responsive to the movement of the case on said conveyor, operative connections between said responsive means and said motive means for energizing said motive means to advance said stop and halt said case, an elevator for said case, motive means for actuating said elevator, means responsive to the movement of said stop, operative connections between said last-named responsive means and said elevator motive means for energizing said elevator motive means to raise said case and connect said articles with the corresponding article-holding members on said carriage, time delay mechanism, and operative connections between said mechanism and said stop and between said mechanism and said elevator motive means for simultaneously retracting said stop and reactivating said elevator motive means to lower the case and disengage the same from said articles held by said carriage.

5. In apparatus for transferring regularly-arranged articles from a case, the combination of a carriage having a plurality of article-holding members regularly arranged thereon in conformance with the regular arrangement of said articles in said case, a conveyor for the case positioned below said carriage, a stop adjacent said conveyor, motive means for advancing said stop in the path of said case moving on said conveyor to halt the same in alignment with said carriage, means responsive to the movement of the case on said conveyor, operative connections between said responsive means and said motive means for energizing said motive means to advance said stop and halt said case, an elevator for said case, motive means for actuating said elevator, means responsive to the movement of said stop, operative connections between said last-named means and said elevator motive means for energizing said elevator motive means to raise said case, means responsive to the raised position of said elevator to connect said articles with the corresponding article-holding members on said carriage, time delay mechanism, and operative connections between said mechanism and said elevator motive means for reactivating said elevator motive means to lower the case and disengage the same from said articles held by said carriage.

6. In apparatus for transferring regularly-arranged articles from a case, the combination of a carriage having a plurality of article-holding members regularly arranged thereon in conformance with the regular arrangement of said articles in said case, a conveyor for the case positioned below said carriage, a stop for the case on said conveyor to halt the case in alignment with said carriage, an elevator for said case, motive means for actuating said elevator, means responsive to the movement of said stop, operative connections between said responsive means and said elevator motive means for energizing said elevator motive means to raise said case, means responsive to the raised position of said elevator, operative connections between said last-named responsive means and said article-holding members for actuating all of the article holding members on said carriage to grip the corresponding articles, a substantially horizontal guide for said carriage, motive means for driving said carriage along the guide, a member engaging said case and movable therewith, means responsive to the lowering movement of said member with the case by said elevator, and operative connections between said last-named responsive means and said carriage motive means for actuating said carriage motive means to drive the carriage and articles held thereby along said guide.

7. In apparatus for transferring regularly-arranged articles from a case, the combination of a carriage having a plurality of article-holding members regularly arranged thereon in conformance with the regular arrangement of said articles in said case, a conveyor for the case positioned below said carriage, a stop for the case on said conveyor to halt the case in alignment with said carriage, an elevator for said case, motive means for actuating said elevator, means responsive to the movement of said stop, operative connections between said responsive means and said elevator motive means for energizing said elevator motive means to raise said case, means responsive to the raised position of said elevator, operative connections between said last-named responsive means and said article-holding means for simultaneously actuating the article-holding members on said carriage to grip the corresponding articles, time delay mechanism for reactivating said elevator motive means to lower the case and disengage the same from the articles held by said carriage, a substantially horizontal guide for said carriage, motive means for driving said carriage along the guide, a member engaging said case and movable therewith, means responsive to the lowering movement of said last-named member with the case by said elevator, and operative connections between said last-named responsive means and said carriage motive means for actuating said carriage motive means to drive the carriage and articles held thereby along said guide.

8. In apparatus for transferring regularly-arranged articles from a case, the combination of a carriage having a plurality of article-holding members regularly arranged thereon in conformance with the regular arrangement of said articles in said case, an elevator for the case positioned below said carriage, motive means for actuating said elevator to raise said case and connect said articles with the corresponding article-holding members, motive means for moving said carriage and suspended articles from vertical alignment with said case, a member engaging said case and movable therewith, means responsive to the descent of said last-named member with the empty case, and operative connections between said responsive means and said last-named motive means for energizing said last-named motive means.

9. In apparatus for transferring regularly-arranged articles from a carriage, the combination of a case having a plurality of article-holding members regularly arranged thereon in conformance with the regular arrangement of said articles in said case, an elevator for the case positioned below said carriage, motive means for actuating said elevator to raise said case and connect said articles with the corresponding article holding members on said carriage, motive means for moving said carriage and suspended articles from vertical alignment with said case, a member engaging said case and movable therewith, means responsive to the descent of said last-named member with the empty case, operative connections between said responsive means and said last-named motive means for energizing said last-named motive means, means actuated by movement of said carriage to a predetermined position, and operative connections between said last-named means and said members for actuating said members to release the articles held thereby.

10. In apparatus for transferring regularly-arranged articles from a case, the combination of a carriage having a plurality of article-holding members regularly arranged thereon in conformance with the regular arrangement of said articles in said case, an elevator for the case positioned below said carriage, motive means for actuating said elevator to raise said case and connect said articles with the corresponding article-holding members on said carriage, motive means for moving said carriage and suspended articles from vertical alignment with said case, article-receiving means beneath the path of said carriage, a member engaging said case and movable therewith, means responsive to the descent of said last-named member with the empty case, operative connections between said responsive means and said last-named motive means for energizing said last-named motive means, means actuated by movement of said carriage to a position over said article-receiving means, and operative connections between said actuated means and said article-holding members for actuating said members to deposit the articles held thereby on said article-receiving means.

11. In apparatus for transferring regularly-arranged articles from a case, the combination of a carriage having a plurality of article-holding members regularly arranged thereon in conformance with the regular arrangement of said articles in said case, an elevator for the case positioned below said carriage, motive means for actuating said elevator to raise said case and connect said articles with the corresponding article-holding members on said carriage, motive means for moving said carriage and suspended articles from vertical alignment with said case, a member engaging said case and movable therewith, means responsive to the descent of said last-named member with the empty case, operative connections between said responsive means and said last-named motive means for energizing said last-named motive means, an article conveyor driven at substantially the same rate and in the same direction of movement of said carriage and positioned beneath the path thereof, means actuated by movement of said carriage to a position over said article conveyor, and operative connections between said actuated means and said article-holding members for actuating said members to deposit the articles held thereby on said article conveyor.

12. In apparatus for transferring regularly-arranged articles from a case, the combination of a carriage having a plurality of article-holding members regularly arranged thereon in conformance with the regular arrangement of said articles in said case, a substantially horizontal guide for said carriage and having a depressed portion, a conveyor for the case positioned below said carriage, an elevator for said case positioned below said carriage to raise said case and connect said articles with the corresponding article-holding members on said carriage and then lower the empty case, motive means for moving said carriage and suspended articles along said guide toward the depressed portion thereof, a member engaging said case and movable therewith, means responsive to the descent of said last-named member, operative connections between said responsive means and said motive means for energizing said motive means, an article-receiving means beneath the depressed portion of said guide, means responsive to the movement of said carriage to the depressed portion of said guide, and operative connections between said last-named responsive means and said article-holding members for actuating said members to deposit the articles held thereby on said article-receiving means.

13. In apparatus for transferring regularly-arranged articles from a case, the combination of a carriage having a plurality of article-holding members regularly arranged thereon in conformance with the regular arrangement of said articles on said case, a substantially horizontal guide for said carriage and having a depressed portion, a conveyor for the case positioned below said carriage, an elevator for said case positioned below said carriage to raise said case and connect said articles with the corresponding article-holding members on said carriage and then lower the empty case, motive means for moving said carriage and suspended articles along said guide toward the depressed portion thereof, a member engaging said case and movable therewith, means responsive to the descent of said last-named member, operative connections between said responsive means and said motive means for energizing said motive means, an article-receiving conveyor beneath the depressed portion of said guide, motive mechanism driving said conveyor at substantially the same linear rate and in the same direction of movement of said carriage in the depressed portion of said guide, means responsive to the movement of said carriage to the depressed portion of said guide, and operative connections between said last-named responsive means and said article-holding members for actuating said members to deposit the articles held thereby on said article-receiving conveyor.

14. In apparatus for transferring regularly-arranged articles from a case, the combination of a carriage having a plurality of article-holding members regularly arranged thereon in conformance with the regular arrangement of said articles in said case, a conveyor for the case positioned below said carriage, a stop for the case on said conveyor to halt the case in alignment with said carriage, an elevator for said case, motive means for actuating said elevator, means responsive to the movement of said stop, operative connections between said responsive means and said elevator motive means for energizing said elevator motive means to raise said case, means responsive to the raised position of said elevator, operative connections between said last-named responsive means and said article-holding members for actuating corresponding article-holding members on said carriage to grip the articles, a substantially horizontal guide for said carriage and having a depressed portion, motive means for driving said carriage along the guide, a member engaging said case and movable therewith, means responsive to the lowering of said last-named member with the case, operative connections between said last-named responsive means for actuating said carriage motive means to drive the carriage and articles held thereby along said guide, article-receiving means beneath the depressed portion of said guide, means responsive to the movement of said carriage to the depressed portion of said guide, and operative connections between said last-named responsive means and said article-holding members for reactuating said article-holding members to deposit the articles held thereby on said article-receiving means.

15. In apparatus for transferring regularly-arranged articles from a case, the combination of a carriage having a plurality of article-holding members regularly arranged thereon in conformance with the regular arrangement of said articles in said case, an elevator for the case positioned below said carriage, motive means for actuating said elevator to raise said case and connect said articles with the corresponding article-holding members, whereby the articles are suspended therefrom, operative motive means for moving said carriage and suspended articles from vertical alignment with said case, a member engaging said case and movable therewith, means responsive to the descent of said last-named member with said case, operative connections between said responsive means and said last-named motive means for energizing the latter, an article conveyor located beneath the path of movement of said carriage, means actuated by movement of said carriage to a predetermined position over said article conveyor, operative connections between said actuated means and said article-holding members for actuating said members to release the articles held thereby onto said article conveyor, means responsive to a predetermined movement of said deposited articles on said article conveyor, and operative connections between said last-named responsive means and said last-named motive means for energizing said last-named motive means to return said carriage to vertical alignment with said elevator and the next succeeding case thereon.

16. In apparatus for transferring regularly-arranged articles from a case, the combination of a carriage having a plurality of article-holding members regularly arranged thereon in conformance with the regular arrangement of said articles in said case, an elevator for the case positioned below said carriage, motive means for actuating said elevator to raise said case and connect said articles with the corresponding article-holding members, whereby the articles are suspended therefrom, motive means for moving said carriage and suspended articles from vertical alignment with said case, a member engaging said case and movable therewith, means responsive to the descent of said last-named member with said case, operative connections between said responsive means and said last-named motive means for energizing said last-named motive means, an article conveyor located beneath the path of movement of said carriage, means actuated by movement of said carriage to a predetermined position over said article conveyor, operative connections between said actuated means and said article-holding members for actuating said members to release the articles held thereby onto said article conveyor, means responsive to a predetermined movement of said deposited articles on said article conveyor, operative connections between said last-named responsive means and said last-named motive means for energizing said last-named motive means to return said carriage to vertical alignment with said elevator and the next succeeding case thereon, time delay means energized by said last-named responsive means, and operative connections between said time delay means and said last-named motive means for disabling the latter after a predetermined period of time.

17. In apparatus for transferring regularly-arranged articles from a case, the combination of a carriage having a plurality of article-holding members regularly arranged thereon in conformance with the regular arrangement of said articles in said case, a conveyor for the case positioned below said carriage, centering mechanism adjacent said conveyor and including elements adapted to engage the front and rear ends of said support, motive means for advancing said elements in the path of said case moving on said conveyor to engage the said ends of said case and halt the same in alignment with said carriage, means responsive to the movement of the case on said conveyor, operative connections between said responsive means and said motive means for energizing said motive means to actuate said elements and halt said case, an elevator for said case, motive means for actuating said elevator, means responsive to the movement of said elements, operative connections between said last-named responsive means and said elevator motive means for energizing said elevator motive means to raise said case toward said carriage, means responsive to a predetermined minimum distance of movement of said elements, and operative connections between said last-named responsive means and said elevator motive means for disabling said elevator motive means.

18. In apparatus for transferring regularly-arranged articles from a case, the combination of a carriage having a plurality of article-holding members regularly arranged thereon in conformance with the regular arrangement of said articles in said case, a conveyor for the case positioned below said carriage, a centering stop adjacent said conveyor, motive means for advancing said stop in the path of said case moving on said conveyor to halt the same in alignment with said carriage, means responsive to the movement of the case on said conveyor, operative connections between said responsive means and said motive means for energizing said motive means to actuate said stop and halt said case, a movable gauge positioned adjacent said conveyor and adapted to be engaged by a portion on said case projecting beyond a predetermined dimension, means actuated by movement of said gauge by said projecting portion on said case, operative connections between said actuated means and said motive means for disabling said motive means to prevent it from actuating said stop, and time delay means actuated in accordance with said movement of said gauge for holding said motive means disabled for a predetermined time to permit the conveyor to move said case beyond said stop.

References Cited in the file of this patent

UNITED STATES PATENTS

| Number | Name | Date |
|---|---|---|
| 1,904,720 | Douglass | Apr. 18, 1933 |
| 2,119,725 | Stecher | June 7, 1938 |
| 2,253,283 | Minaker | Aug. 19, 1941 |
| 2,371,128 | Costa | Mar. 13, 1945 |
| 2,442,827 | Schmidt | June 8, 1948 |
| 2,452,927 | Hammen | Nov. 2, 1948 |
| 2,466,693 | Fischer | Apr. 12, 1949 |
| 2,597,387 | Seidel et al. | May 20, 1952 |
| 2,608,308 | Taylor | Aug. 26, 1952 |
| 2,609,108 | Peterson et al. | Sept. 2, 1952 |